July 7, 1953 — A. C. PETERSON — 2,644,295
COMPOUND COMBUSTION ENGINE
Filed Jan. 3, 1950 — 4 Sheets-Sheet 4

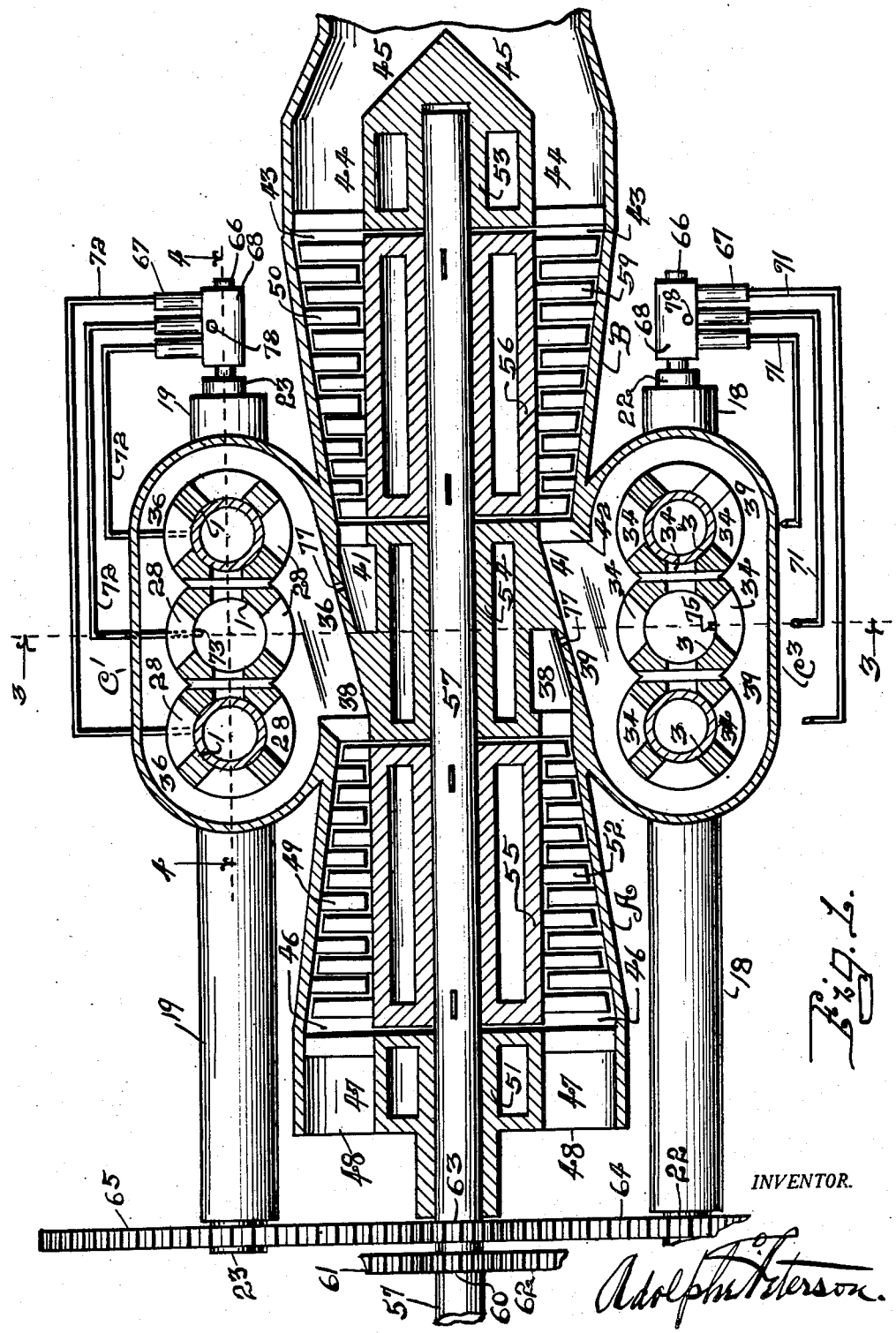

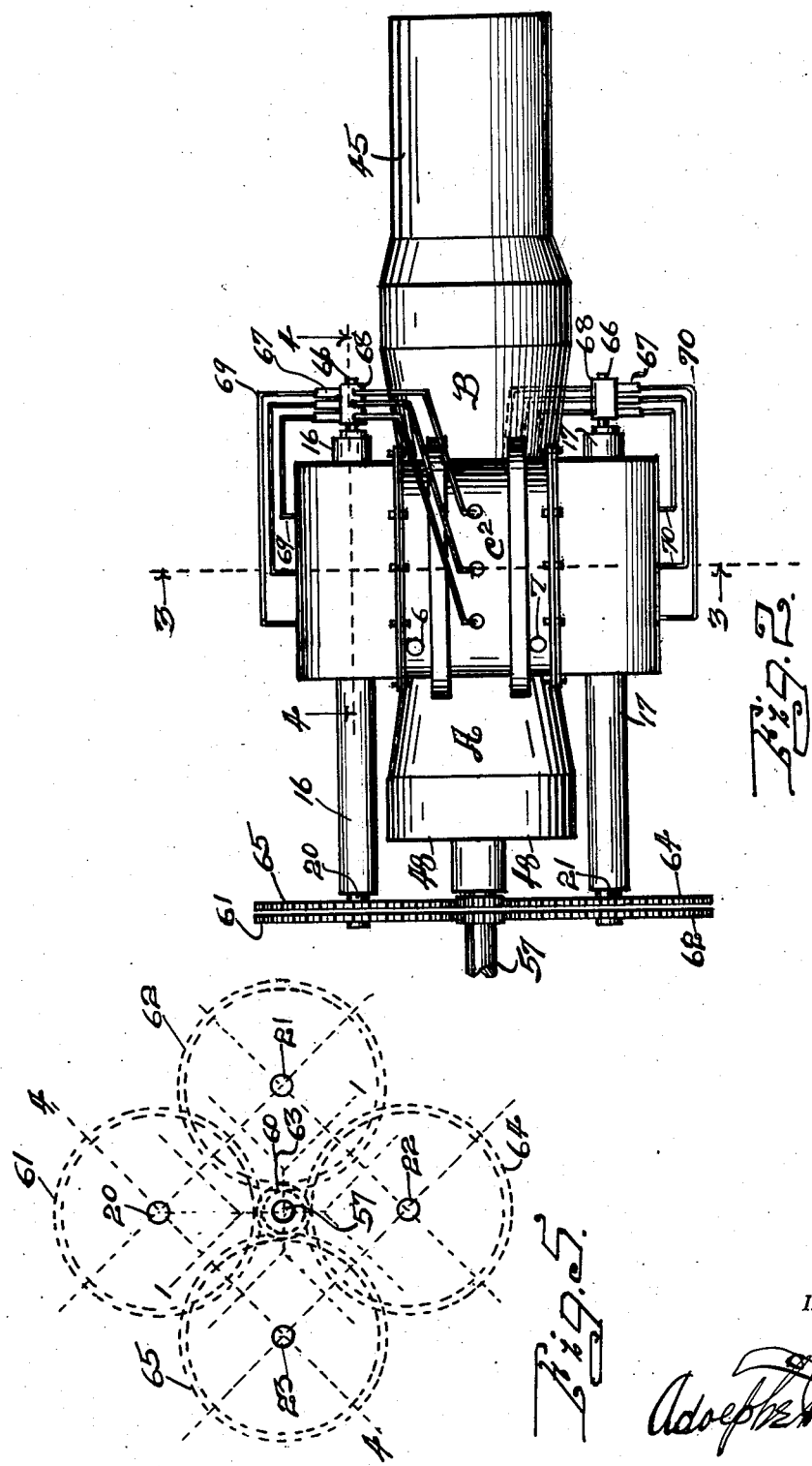

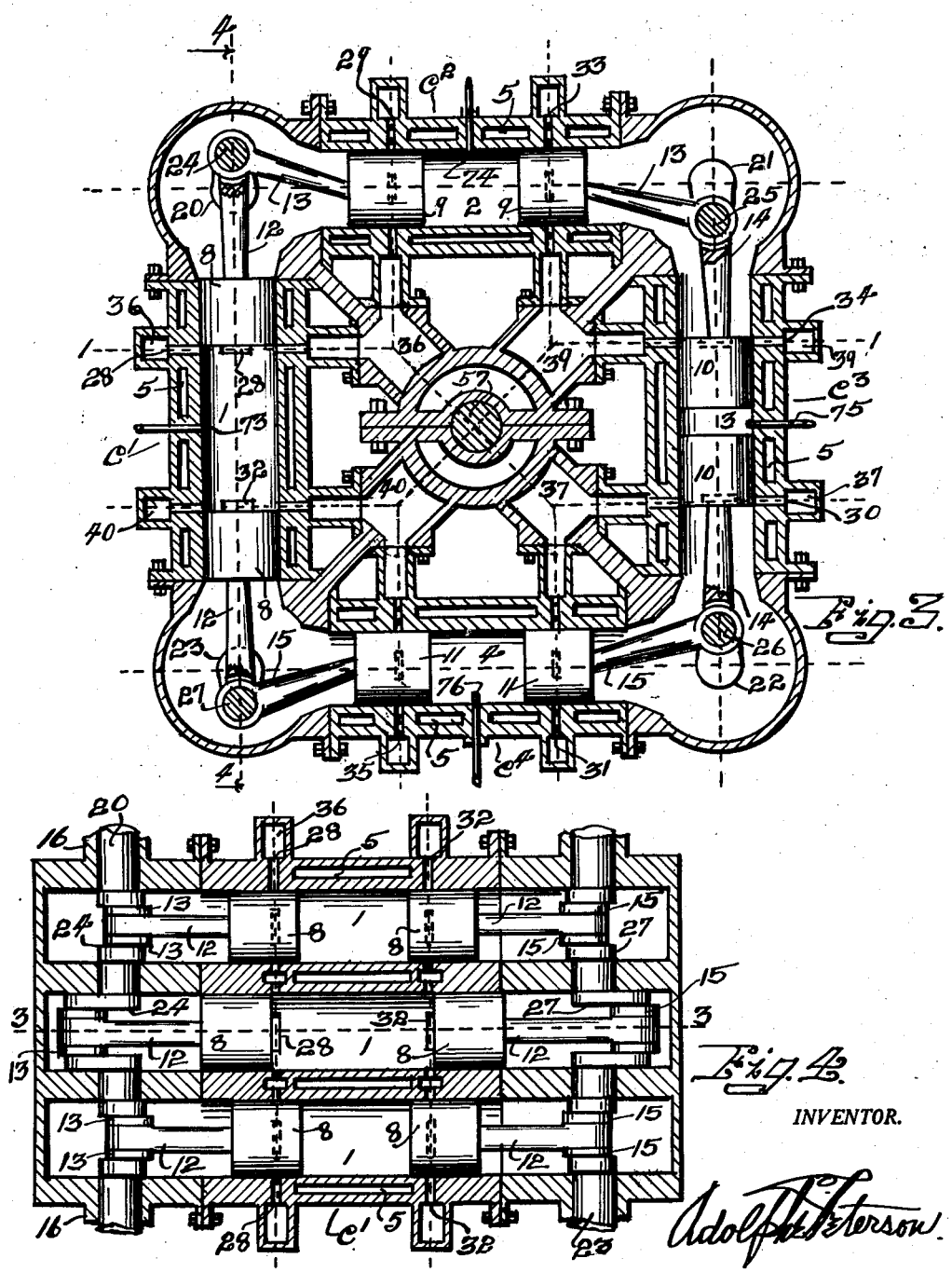

INVENTOR.
Adolf C. Peterson

Patented July 7, 1953

2,644,295

UNITED STATES PATENT OFFICE 2,644,295

COMPOUND COMBUSTION ENGINE

Adolphe C. Peterson, Minneapolis, Minn.

Application January 3, 1950, Serial No. 136,593

5 Claims. (Cl. 60—13)

My invention relates to a form of engine comprising a relatively high pressure and a relatively low pressure unit in a compound relation, and I therefore call my invention compound combustion engine.

The principal objects are to provide a form of engine which is especially adaptable for use in high powered engines where great efficiency is especially desirable, such as in long distance airplanes, locomotive engines, marine engines, and utility system engines such as are used for electric power production. An object is to provide a form of reciprocating engine and turbine combination wherein the combined unit is relatively simple and may be cheaply constructed, and wherein the fuel may be used in a cycle involving relatively very high pressure such as in diesel engines, and may be further used in extension of the cycle in a turbine employing the gases at a lower pressure for energy utilization. An object is to provide such an engine in a form which is relatively simple and is small in total area and cubic space needed in proportion to the power output, and which will provide a comparatively large power in proportion to the complication and weight involved. In general the object is to improve upon engines utilizing the especially advantageous features of the turbine for power production in connection with the direct utilization of combustion gases for power production, especially in the very powerful plants, and especially in such plants as are used for long distance travel in air, or on land or sea.

The principal devices and combinations of devices comprising my invention are as hereinafter described and as defined in the claims. In the accompanying drawings which illustrate my invention, like parts are designated by like numerals throughout the illustrations and in the several modified forms in so far as practicable. Referring to the drawings:

Figure 1 is a longitudinal section chiefly through the plane passing through the axis of the shaft of the compressor-turbine section of the device, and is partly also a section passing transversely through cylinders of two of the sets of reciprocating engines comprised in the device, the section being planes on four different lines of Figures 3, 5, namely from I at the left of Figure 3 thence rightwardly in Fig. 3 to the 45 degree line passing to the axis of the turbine shaft as shown in Fig. 3, thence along that 45 degree line to the axis of said shaft, thence from that axis along the 45 degree line passing through the axis of said shaft (at 90 degrees to the first named 45 degree line), rightwardly and upwardly along that line to the horizontal line extending rightwardly to the numeral I, that is as may be otherwise stated the line I—I passing through the axis of the turbine shaft. Some parts are shown in full plan view and some parts are broken away.

Figure 2 is a view in reduced scale, approximately one-half that of Figure 1, showing the device in full plan view, the shaft being shown broken away.

Figure 3 is a section on a vertical plane transversely of and at right angles to the plane of Figure 1, this section being on the lines 3—3 of Figures 1, 2, 4, some parts being broken away, this view being on the same scale as that of Figure 1, this view being principally a vertical section transversely of cylinders of the reciprocating engine section of the device.

Figure 4 is a vertical section on a plane on the line 4—4 of Figures 1, 2, 3, 5, this section being through the vertical axes of cylinders of one set of the four reciprocating sets comprising the engine, some parts being broken away.

Figure 5 is a diagrammatic sketch looking from the left end of Fig. 1, to show the relation of the gears coordinating driving of the shafts of the engine, this diagram being placed at a forty-five degree angle from that of Figure 3, and being on a scale similar to that of Fig. 2.

Figure 6:
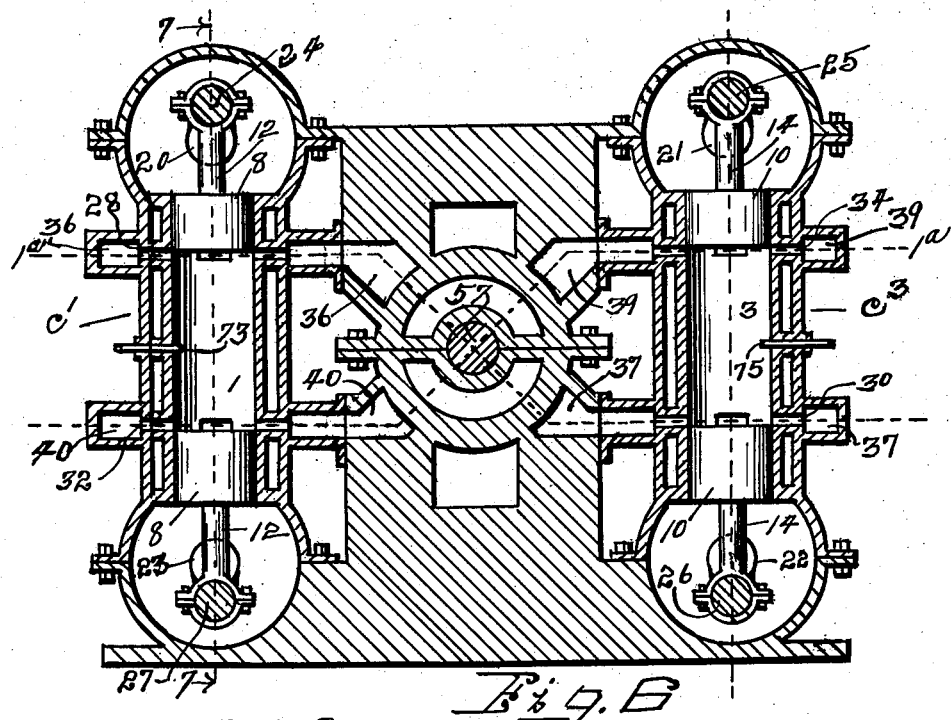
Fig. 6 is a section similar to that of Fig. 3, and Fig. 7 a section similar to that of Figure 4 of a modified form eliminating sets $C^2$ and $C^4$, Fig. 6 being a section on line 6—6 of Fig. 7, and Fig. 7 a section on line 7—7 of Fig. 6.

Referring now to the figures from 1 to 5 both inclusive, there is shown thereby, a compound engine means having generally an axial flow air compressor A, an axial flow turbine B, and four sets of so-called high pressure combustion cylinders denoted, respectively, $C^1$, $C^2$, $C^3$, and $C^4$. The air compressor A and the turbine B are axially in alignment, and the four sets of combustion cylinders designated, are placed on the four sides of a rectangle in the plane transversely of and intermediately of the air compressor A and turbine B. Each said set of combustion cylinders is comprised of three cylinders placed in a plane which is at one side of the said rectangle about said intermediate plane, so that thus there are three combustion cylinders, as designated, on each side of the said rectangle, each said set of three being in a plane which is parallel to the axis of the said compressor A and turbine B. The four sets of said combustion cylinders thus form the four sides of a rectangle about the axis of the said compressor A and turbine B and each set has the three combustion cylinders lying in a plane parallel to the said axis of compressor A and turbine B.

Each said set of combustion cylinders is formed as a cylinder casting, respectively designated as above, $C^1$, $C^2$, $C^3$, $C^4$, and each has the internal three cylinder bores, denoted, respectively, 1, 2, 3, 4, in the respective sets of cylinders. These cylinder bores are so placed in the set that their axes are in the plane which is at the one side of the aforementioned rectangle. Cooling jacket spaces in all the said sets are denoted 5, and these cooling spaces may be supplied with cooling fluid, as water, or oil or air or any fluid, by in-flow and out-flow, circulating pipes 6, 7, respectively, the means for supplying such cooling fluid not being shown, but being contemplated to be of any type such as commonly used in connection with internal combustion engines.

Each set of combustion cylinders has reciprocating pistons in each said cylinder, there being one pair of pistons in each cylinder of each said set, the pairs of pistons in the sets being designated, 8, 9, 10, 11, respectively. There are six pistons of each designation in each said set, in toto, these including three pairs of pistons. Each pair of pistons, that is the pair in any one cylinder of any said set, are so coordinated in their reciprocating movements in the cylinder, that the two pistons of any pair move toward each other during substantially all of one-half of their cycle of reciprocation, and move away from each other during the remaining one-half of the cycle of reciprocation. The pistons of the said sets are flexibly connected and move with connecting rods, designated, 12, 13, 14, 15, respectively, as to the said sets.

In the lines where the four planes, about said rectangle, where said sets of combustion cylinders are located and intersect, that is at each of said four intersections, there are rotatably mounted in bearings, all designated, respectively, as to the sets, 16, 17, 18, 19, crank shafts 20, 21, 22, 23. Each crank shaft is thus rotatable in the intersection of two adjoining planes of combustion cylinders and its cranks 24, 25, 26, or 27, respectively, as to the crank shafts, have flexibly mounted thereon the wrist ends of the said connecting rods, each crank having thereon the wrist end of one connecting rod connected with a piston in one adjoining plane and also the wrist end of one connecting rod connected with a piston in the adjoining plane which is at right angles to the first named plane. Thus each crank controls the movements of pistons in two adjoining planes which are at right angles to each other. There are cylinders composed of one cylinder in each combustion cylinder set in each of three planes transversely of the axis of the compressor A and turbine B, so that the pistons in each of said three transverse planes are controlled by cranks in the same transverse plane and each set of pistons in each said transverse plane is controlled to have substantially the same coordination of movement as shown in Figure 3 with respect to the pistons of one of said transverse planes, the intermediate plane of the three, but the movements in the said three planes, are such, by the different positions of cranks in the crank shaft, that the phases are advanced with respect to each other, that is so that in the three cylinders of any one said set, that is, $C^1$, $C^2$, $C^3$, $C^4$, the pistons procure maximum compression at points 120 degrees, 240 degrees, and 360 degrees, of the cycle of the crank shafts associated.

Each combustion cylinder has inlet ports in its sides, designated 28, 29, 30, 31, as to the said sets of combustion cylinders, and each combustion cylinder has exhaust ports in its sides, designated 32, 33, 34, 35, respectively, as to the said sets of combustion cylinders. Two adjoining sets of inlet ports, as designated, receive air under compression from compressed air channels 36 and 37, respectively, and each of the latter receive the compressed air from an annular chamber 38 which is the annular air discharge chamber of the compressor A. Two adjoining sets of exhaust ports, as designated, receive gases from the associated cylinders and discharge the gases by way of exhaust gas channels 39 and 40, respectively, and the latter discharge the gases, which are under relatively high pressure, still, to the annular pressure gas chamber 41, which is common to all the combustion cylinders and is the gas chamber from which gases discharge by way of gas nozzles formed by guide blades or stator blades 42 annularly about the axis of turbine B into the annular turbine blade passage 43. The latter discharges by way of annular discharge chamber 44 to a discharge tube 45, which may be any conduit to atmosphere or may be a jet discharge tube to atmosphere directly rearwardly of the airplane on which the device may be mounted or other device on which it may be mounted.

The annular chamber 38 receives compressed air from the annular compressing passage 46 of the air compressor A and this passage receives air at the low pressure end by way of annular air entry tube or chamber 47, this latter being open to atmosphere at 48, or being connected by way of any conduit, not shown, with atmosphere. If the device is mounted in an airplane, the chamber 47 would receive air from atmosphere by way of any means directing the air from forwardly of the device, that is oppositely to the direction of the discharge tube 45. The compressing passage 46 has located therein in annular stages compressor stator blades 49. The annular turbine blade passage 43 has mounted therein in annular stages turbine stator blades 50.

The compressor A has mounted axially therein to rotate in bearings 51, a compressor rotor having compressor blades 52 mounted in annular stages on the rotor. The turbine B has mounted therein axially, to rotate in bearing 53 and the intermediate bearing 54, a turbine rotor having turbine rotor blades mounted therein in annular stages. The compressor rotor 55 and the turbine rotor 56 are mounted on the one shaft 57, this being representative of any type of means connecting the rotors to rotate as a unit. The turbine rotor is denoted 56 and its blades 59.

The shaft 57 at its extreme forward end, or either end, may be a drive shaft driving any means such as an electric generator or it may drive a propeller, not shown, by any means. The shaft 57 has fixed thereon to rotate therewith near one end, a small spur gear 60 which is permanently in gear with two large spur gears 61, 62. There is fixed on shaft 57 adjacent spur gear 60 a spur gear 63 of the same size as gear 60 and this spur gear 63 drives or is driven by the two large spur gears 64, 65, the latter two being of the same size as the two gears 61, 62, so that the large gears operate in similar timing. The large spur gears 61, 62, 64, 65, are fixed, one on the end of each crank shaft 20, 21, 22, 23, respectively, so that thus the four crank shafts are geared to the one turbine shaft 57, so that the turbine shaft 57 rotates at a speed which may be at least five times that of the crank shafts and may be as much as ten or more times the speed of the crank shafts.

Each crank shaft 20, 21, 22, 23, has connection at one end thereof with a fuel pump shaft 66 so that the crank shaft drives at the same speed as its own, the pumping plungers (not shown), in the pump cylinders or plunger cylinders 67, of which there are three in each pump means 68. Each pump cylinder 67 delivers fuel periodically and cyclically into the associated fuel pipe 69, 70, 71, or 72, there being three fuel pipes of each designation, that is, one fuel pipe for each combustion cylinder, of which there are twelve. Each fuel pipe delivers its fuel, through an associated fuel injection nozzle, of which there are four sets, 73, 74, 75, 76, respectively, each set consisting of three, one for each combustion cylinder. The injection nozzles are placed, one in the central section of each combustion cylinder bore, so that it will deliver the fuel into the compressed air at the center section of the combustion cylinder bore, at approximately the moment of maximum compression in the combustion cylinder. The maximum compression in each combustion cylinder may be as much as six hundred pounds or more, or may be less, and ignition may be by the heat of compression, as in diesel engines, in each combustion cylinder, or it may be by any form of spark plug ignition, as created by any form of electric current and timing means, not shown. It is preferred that ignition be by the heat of compression.

The compressed air channels 36 and 37 are formed in the metal of the compressor and turbine casings and the intermediate bearing section, and in the metal of the cylinder sets, and it should be noted especially that the compressed air channels do not connect in any manner directly with the exhaust gas channels 39 and 40, the latter being likewise formed in the metal of the casings, bearing, and cylinder sets. Thus the compressing space of the air compressor A is not connected directly with the turbine space of turbine B, but only by way of the inlet ports of the combustion cylinders, the compression spaces of the combustion cylinders and the exhaust ports of the combustion cylinders.

There may, however, be small apertures 77, which may permit a relatively small quantity of compressed air from the air compressor A to by-pass the combustion cylinders, and flow directly into the turbine nozzle space, serving to slightly cool the combustion gas exhaust from the combustion cylinders. These apertures 77 may in some constructions, where especially high efficiency is desired, and where the turbine blades and rotor are constructed of an alloy which will withstand high temperatures, or where they are in some manner cooled, be entirely omitted, so that there will be no air by-passing the combustion cylinders. It is intended that these apertures may be proportioned somewhat according to the type of construction desired and its use. Especially where the device may be constructed for airplane use, and the gas discharge from the discharge tube will have somewhat of the characteristics of a jet discharge for jet propulsion, the apertures 77 may be proportionately larger. For electric power generation, where great efficiency is desired, the apertures may be omitted entirely or closed. In any case the apertures 77 must not be and are contemplated not to be so large or to permit so much air to flow, as will materially affect the main flow through the inlet ports of the combustion cylinders and through these cylinders, and as exhaust combustion gases from the exhaust ports of the combustion cylinders, to the turbine B. In any construction, the combustion cylinders and the air compressor and turbine, will be proportioned in size, and in their capacities, so that the best attainable efficiency of operation will be secured. It is contemplated that the air compressor will be so proportioned that an air pressure, at the inlet ports of the combustion cylinder, of not less than say fifty to seventy pounds, will be maintained, or even a higher pressure, if attainable in any construction. The combustion cylinders will be so proportioned that their compression spaces will be so sufficiently large, that the pressures will rise to say six hundred pounds, more or less, according to construction and use, and will not, as air compression, exceed that predetermined pressure of compression.

The turbine B will be so proportioned that the exhaust gases flowing into it will be at a pressure only sufficiently below that of the air compression in compressor A, to effect the normal flow through the combustion cylinders in the charging periods, and so that the flow through the turbine space, will be effected. The turbine may be constructed to utilize the heat of the combustion gases, in any manner as turbines are usually constructed, the heat being utilized, to create velocity of the gases and effect propulsion by expansion, either by way of reaction or impulse, as between the rotor blades and stator or guide blades.

The spur gear arrangement shown, between the crank shafts and the turbine shaft, is only representative of any arrangement for coordinating the rotation of the shafts, and it should especially be noted, that this arrangement may be only a means for coordinating the movement of the crank shafts with respect to each other, and that the crank shafts need not act with the turbine shaft in any particular power driving arrangement, that is that the turbine shaft may be disconnected from the crank shafts, and either the crank shafts or the turbine shaft drive independently of the other any device, such as air propeller means. It may be noted that driving power may flow from either the crank shaft means of the reciprocating pistons or from the shaft of the turbine rotor to the shaft of the air compressing rotor, and that in any construction, driving power may flow from either one of said crank shaft means or said turbine rotor to said air compressing rotor, and that accordingly in any unit, drive from the other of the said crank shaft means and the said turbine rotor may be eliminated.

The general operation is now briefly described. The fuel pumps are connected with any fuel supply by means of the supply conduits 78. Any lubrication means, as commonly used, may be supplied. The turbine shaft 57 may have any means for starting, connected to it, such means not being shown, and such means may be any electrical type or otherwise. Having started the turbine shaft in rotation, or having started the crank shafts in rotation, by any means, as customarily used, the air compressor A will now start drawing air from atmosphere and compress the air to say sixty pounds pressure, more or less, and this compressed air will flow through the compressed air channels 36 and 37, and by way of any open inlet ports to combustion cylinders, this flow being a periodic and cyclic charging of the combustion cylinders of the cylinder sets. There being twelve of such cylinders, this flow will be substantially or nearly uninterrupted, and the timing of piston movements should be such as to attain this substantially continuous flow through one or other of the cylinders. At each opening of any cylinder to the compressed air channels 36—37, by means of an inlet port, as uncovered by a piston, air under the pressure of sixty pounds, will flow into the cylinder, as exhausting combustion gases flow outwardly from the other end of the same cylinder through the associated exhaust port means, and this exhaust flow will be at high temperature, say near twelve hundred degrees (1200°), more or less, and at a pressure, just slightly below the pressure of the air in the compressed air channels 36, 37, and may even be higher momentarily, as the exhaust ports open, if they are, as in some two cycle engines timed to open very slightly before the inlet ports open.

As each volume of air is forced into a combustion cylinder and displaces combustion gases, the pistons of the cylinder will then move toward each other in the compression phase of the cycle of the cylinder, and the air will be compressed to a pressure which may be as much as say six or seven hundred pounds, and the temperature will be increased to say six hundred degrees (600°) or even more, as may be sufficient to cause ignition, and at this moment of approximately maximum compression, in any one combustion cylinder, the fuel pump associated will force fuel, as gasoline or petroleum or gas, into the compressed air mass in the cylinder and combustion will then ensue, so that the temperature and pressure of combustion is even higher than the pressure and temperature of compression, and this temperature will be maintained through a portion of the expansion phase of the cycle of the combustion cylinder, and thereby contribute driving power to the device. The exhaust gases, from the twelve cylinders occurring periodically and cyclically, according to the movements of the pistons, will flow in substantially or nearly substantially continuous flow to the annular nozzle chamber of turbine B by means of discharge channels 39 and 40.

The exhaust gases will flow from the nozzles into the turbine rotor blade space, and drive the turbine rotor thereby, and from this space the gases will exhaust at a pressure just slightly above atmospheric pressure, into the discharge tube 45, and thereby to atmosphere. In this discharge the gases, if the device is mounted, on any mobile contrivance, assist in the propulsion thereof by their jet reaction effect. In the event that exhaust gases from the combustion cylinders are at a higher temperature than such as the turbine rotor blades, should be subjected to, the apertures 77 may be supplied in the construction, and in that event, if the exhaust gases have a temperature of say fifteen hundred degrees Fahrenheit (1500° F.), a slight amount of air may bypass the combustion cylinders, through apertures 77, and flow directly into the turbine nozzle chamber and mix with the exhaust gases from the combustion cylinders, thereby cooling them to say twelve hundred degrees (1200°) which is generally a suitable temperature for turbines. Since the air compression to sixty pounds, will provide a relatively large volume of air each charge in a combustion cylinder, the fuel charges may also be relatively large, and the exhaust gas temperature, from the combustion cylinders, will be relatively high, and may in some cases exceed a temperature suitable for the turbine rotor, so that in that event the apertures 77, will be provided and serve to provide some small volume of cooling air while not disturbing the charging relation of the pressures. These air apertures 77 will be somewhat in the nature of air nozzles only, and not passage for the transfer of large volumes of air. But in case of use of the device in connection with jet propulsion, as part of the power provision, or propulsion provision, the apertures 77 may be proportioned to by-pass a larger proportion of air, while, however, not being such as to interfere with the charging pressure differential relation.

Figure 7:
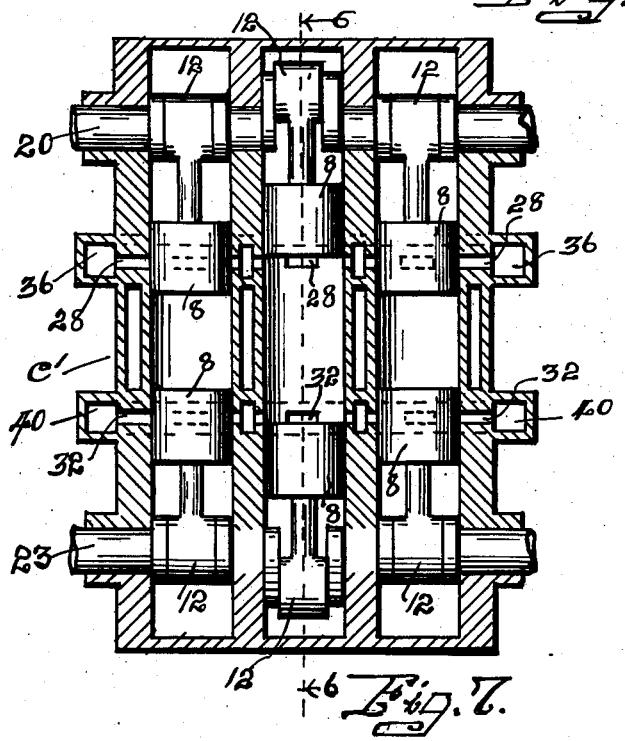

Referring now to Figures 6 and 7, which show a modified form of my device, this form would be exactly the same in general as the form shown in Figures 1 to 5, both inclusive, except that there are only the two sets of engine cylinders $C^1$ and $C^3$, and the sets $C^2$ and $C^4$, are eliminated from the construction, and the fuel supply to the two sets of cylinders $C^2$ and $C^4$ is also eliminated. Since it is the same, in the longitudinal section, similar to that of Figure 1 as to the first form (except that two sets of fuel pumps are eliminated), a view corresponding to Figure 1 is not shown, and it should be understood that the construction is the same in so far as the construction shown in Figure 1 of the first form. Referring to Fig. 6, a transverse section, the cylinder sets $C^1$ and $C^3$ are shown, and their pistons 8 and 10, respectively, are connected by the connecting rods 12 and 14, respectively, to the crank shafts 20—23, and 21—22, respectively, but there are no connecting rods 13 and 15, and no connected pistons. Inlet ports 28 and 30 receive the compressed air from compressed air passages 36 and 37. Exhaust ports 32—34 exhaust to the exhaust gas passages 40—39, and the latter deliver as in the first form to the annular space which is the entrance to the turbine blade space 43. The compressed air is received by inlet ports 28—30 from the annular space 38 to which the compressed air is delivered by the air compressor rotor 55 and rotor blades 52. Fuel nozzles 73 and 75 deliver fuel periodically to the cylinders 1 and 3, respectively of each set, in cyclic order, as air is compressed to about the maximum compression. This form functions as the first form functions with respect to cylinder sets $C^1$ and $C^3$, and compressor rotor 55 and turbine rotor 56, and the air reception from atmosphere and gas discharge through the turbine space to atmosphere via tube 45. A section on line $1^a$—$1^a$ Fig. 6 would be similar to the section shown in Figure 1, of the first form shown.

While I have shown specific detailed parts and combinations of parts in the illustration of my invention, I contemplate that other detailed devices and combinations of devices, may be utilized in the realization of my invention without departing from the spirit and intention thereof.

What I claim is:

1. In a power production means, a turbine casing having an expansion space therein and a turbine rotor mounted in said expansion space, an air compressing unit having an air intake and a compressed air discharge, a plural number of cylinders stationed in four planes adjacent turbine rotor each one of said planes being on one side of a rectangle in a plane transversely of the axis of said turbine rotor the longitudinal axes of said cylinders being in said planes, a pair of oppositely reciprocating pistons in each of said cylinders in said planes, a crank shaft means having driving connection between it and each of said pistons to effect opposite reciprocation of the pistons of each pair of pistons, the said crank shaft means comprising a crank shaft at each of the four intersections of said planes the axis of the crank shaft being substantially in said intersection, inlet means for each cylinder in each of said planes and connecting passages therefrom to said compressed air discharge, exhaust means for each cylinder in each of said planes and connecting passages therefrom to the entrance to said turbine expansion space, a discharge from said turbine expansion space, means for periodically charging each of said cylinders with fuel for combustion with air compressed therein, and a driving connection between one of the said turbine rotor and the said crank shaft means to drive the air compressing unit.

2. In a power production means, a turbine casing having an expansion space therein and a turbine rotor mounted in said expansion space, an air compressing unit having an air intake and a compressed air discharge, a plural number of cylinders stationed in four planes adjacent and parallel to the axis of said turbine rotor each one of said planes being on one side of a rectangle in a plane transversely of the axis of said turbine rotor the longitudinal axes of said cylinders being in said planes, a pair of oppositely reciprocating pistons in each of said cylinders in said planes, a crank shaft means having driving connection between it and each of said pistons to effect opposite reciprocation of the pistons of each pair of pistons, the said crank shaft means comprising a crank shaft at each of the four intersections of said planes the axis of the crank shaft being substantially in said intersection, inlet means for each cylinder in each of said planes and connecting passages therefrom to said compressed air discharge, exhaust means for each cylinder in each of said planes and connecting passages therefrom to the entrance to said turbine expansion space, a discharge from said turbine expansion space, means for periodically charging each of said cylinders with fuel for combustion with air compressed therein, and a driving connection between one of the said turbine rotor and the said crank shaft means to drive the air compressing unit.

3. In a power production means, a turbine casing having an expansion space therein and a turbine rotor with turbine rotor blades mounted to rotate in the expansion space, an air compressor casing and an air compressor rotor having compressor rotor blades mounted to rotate in the air compressor casing and having an air intake to the air compressor casing and a compressed air discharge from the air compressor casing; a plural number of combustion cylinders stationed in four planes adjacent and parallel to the axis of the turbine rotor each one of said planes being on one side of a rectangle in a plane transversely of the axis of the turbine rotor the longitudinal axes of the combustion cylinders being in said planes and the axes of said turbine rotor and the air compressor rotor being co-incidental and centrally of the four planes; a pair of oppositely reciprocating pistons in each of the combustion cylinders in said planes, a crank shaft means having driving connection between it and each of the pistons to effect opposite reciprocation of the pistons of each pair of pistons, the said crank shaft means comprising a crank shaft rotatably mounted at each of the four intersections of said planes the axes of the crank shafts being substantially in said intersections; inlet means for each combustion cylinder in each of said planes and connecting passages therefrom to said compressed air discharges; exhaust means for each combustion cylinder in each of said planes and connecting passages therefrom to the entrance to said turbine expansion space; a discharge from said turbine expansion space; means for periodically charging each of said combustion cylinders with fuel for combustion with air compressed therein; and a driving connection from one element of the said turbine rotor and the said crank shaft means to drive the air compressor rotor.

4. In a power production means, a turbine casing having an expansion space therein and a turbine rotor mounted in said expansion space, an air compressing unit having an air intake and a compressed air discharge, a plural number of combustion cylinders stationed in four planes adjacent and parallel to the axis of the turbine rotor each one of said planes being on one side of a rectangle in a plane transversely of the axis of the turbine rotor the longitudinal axes of the combustion cylinders being in said planes, a pair of oppositely reciprocating pistons in each of the combustion cylinders in said planes, a crank shaft means having driving connection between it and each of the pistons to effect opposite reciprocation of the pistons of each pair of pistons, the said crank shaft means comprising a crank shaft at each of the four intersections of said planes the axes of the crank shaft being substantially in the intersections; inlet means for combustion cylinders of two intersecting planes of cylinders and located near one intersection wherein one crank shaft rotates and receiving compressed air through one common passage from the compressed air discharge; inlet means for combustion cylinders of the other two planes of cylinders and located near the diametrically opposite intersection wherein the diametrically opposite crank shaft rotates and receiving compressed air through one common passage opposite to the other common passage from the compressed air discharge; exhaust means for combustion cylinders of two intersecting planes of cylinders and located near one intersection wherein one of the remaining crank shafts rotates and discharging combustion products through one common combustion gas discharge to one side of the entrance to said turbine expansion space; exhaust means for combustion cylinders of the other two planes of cylinders and located near the intersection diametrically opposite to the last named intersection wherein the remaining crank shaft rotates and discharging combustion products through one common combustion gas discharge to the diametrically opposite side of the entrance to said turbine expansion space; a discharge from the turbine expansion space; means for periodically charging each of the combustion cylinders with fuel for combustion with air compressed therein; and a driving connection from one element of the said turbine rotor and the said crank shaft means to drive the air compressing unit.

5. In a power production means, a turbine casing having an expansion space therein and a turbine rotor with turbine rotor blades mounted to rotate in the expansion space, an air compressor casing and an air compressor rotor having compressor rotor blades mounted to rotate in the air compressor casing and having an air intake to the air compressor casing and a compressed air discharge from the air compressor casing; a plural number of combustion cylinders stationed in four planes adjacent and parallel to the axis of the turbine rotor each one of said planes being on one side of a rectangle in a plane transversely of the axis of the turbine rotor the longitudinal axes of the combustion cylinders being in said planes and the axes of said turbine rotor and the air compressor rotor being co-incidental and centrally of the four planes; a pair of oppositely reciprocating pistons in each of the combustion cylinders in said planes, a crank shaft means having driving connection between it and each of the pistons to effect opposite reciprocation of the pistons of each pair of pistons, the said crank shaft means comprising a crank shaft rotatably mounted at each of the four intersections of said planes the axes of the crank shafts being substantially in said intersections; inlet means for combustion cylinders of two intersecting planes of cylinders and located near one intersection wherein one crank shaft rotates and receiving compressed air through one common passage from the compressed air discharge; inlet means for combustion cylinders of the other two planes of cylinders and located near the diametrically opposite intersection wherein the diametrically opposite crank shaft rotates and receiving compressed air through one common passage opposite to the other common passage from the compressed air discharge; exhaust means for combustion cylinders of two intersecting planes of cylinders and located near one intersection wherein one remaining crank shaft rotates and discharging combustion products through one common combustion gas discharge to one side of the entrance to said turbine expansion space; exhaust means for combustion cylinders of the other two planes of cylinders and located near the intersection diametrically opposite to the last named intersection wherein the remaining crank shaft rotates and discharging combustion products through one common combustion gas discharge to the diametrically opposite side of the entrance to said turbine expansion space; a discharge from the turbine expansion space; means for periodically charging each of the combustion cylinders with fuel for combustion with air compressed therein; and a driving connection from one element of the said turbine rotor and the said crank shaft means to drive the air compressor rotor.

ADOLPHE C. PETERSON.

References Cited in the file of this patent

UNITED STATES PATENTS

| Number | Name | Date |
|---|---|---|
| 1,006,907 | Büchi | Oct. 24, 1911 |
| 1,037,757 | Haines | Sept. 3, 1912 |
| 1,047,227 | Hopkins | Dec. 17, 1912 |
| 1,148,653 | Blake | Aug. 3, 1915 |
| 1,701,366 | Herr et al. | Feb. 5, 1929 |
| 1,879,911 | Robertson | Sept. 27, 1932 |
| 1,993,963 | Heinze | Mar. 12, 1935 |
| 2,176,021 | Grutzner | Oct. 10, 1939 |
| 2,296,268 | Büchi | Sept. 22, 1942 |
| 2,346,587 | Kilchenmann | Apr. 11, 1944 |
| 2,348,518 | Birkigt | May 9, 1944 |
| 2,431,563 | Johansson | Nov. 25, 1947 |
| 2,468,157 | Barlow et al. | Apr. 26, 1949 |